United States Patent
Bigge et al.

(10) Patent No.: US 10,368,491 B2
(45) Date of Patent: Aug. 6, 2019

(54) SUN SCREEN STRUCTURE

(71) Applicant: MTD Products Inc, Valley City, OH (US)

(72) Inventors: William Bigge, Brunswick, OH (US); Gerald Hobrath, Brunswick, OH (US)

(73) Assignee: MTD Products Inc, Valley City, OH (US)

( * ) Notice: Subject to any disclaimer, the term of this patent is extended or adjusted under 35 U.S.C. 154(b) by 0 days.

(21) Appl. No.: 15/711,557

(22) Filed: Sep. 21, 2017

(65) Prior Publication Data
US 2018/0077869 A1 Mar. 22, 2018

Related U.S. Application Data

(60) Provisional application No. 62/397,602, filed on Sep. 21, 2016.

(51) Int. Cl.
| | |
|---|---|
| *A01D 67/02* | (2006.01) |
| *A01D 67/00* | (2006.01) |
| *A45B 17/00* | (2006.01) |
| *A01D 101/00* | (2006.01) |
| *B60R 21/11* | (2006.01) |
| *A45B 23/00* | (2006.01) |

(52) U.S. Cl.
CPC ........... *A01D 67/02* (2013.01); *A01D 67/005* (2013.01); *A45B 17/00* (2013.01); *A01D 2101/00* (2013.01); *A45B 2023/0093* (2013.01); *A45B 2200/1009* (2013.01); *B60R 21/11* (2013.01)

(58) Field of Classification Search
CPC .............................. A01D 34/82; A01D 67/02; A45B 2023/0093; E04H 15/60; A61H 3/008; B60R 21/11

USPC ...... 135/88.01, 88.05, 88.08, 128, 133, 114; 296/102
See application file for complete search history.

(56) References Cited

U.S. PATENT DOCUMENTS

| | | | | | |
|---|---|---|---|---|---|
| 1,491,306 | A | * | 4/1924 | Kirkham ............ | B62D 33/0621 224/187 |
| 2,631,057 | A | * | 3/1953 | Weaklend .......... | B62D 33/0621 135/137 |
| 3,082,780 | A | * | 3/1963 | Macy ...................... | E04H 15/38 135/115 |
| 3,205,003 | A | * | 9/1965 | Jensen ............... | B62D 33/0625 296/102 |

(Continued)

OTHER PUBLICATIONS

International Search Report and Written Opinion for International Patent Application No. PCT/US2017/052723 dated Nov. 29, 2017.

*Primary Examiner* — Noah Chandler Hawk
(74) *Attorney, Agent, or Firm* — Wegman, Hessler & Vanderburg

(57) ABSTRACT

A sun shade for a lawn maintenance tool includes a bracket configured to accommodate a profile of the lawn maintenance tool to the rear of the seat. A frame is configured to cooperate with the bracket, and a fastener attaches the frame and the bracket to the lawn maintenance tool. A quantity of material is attached to the frame above the lawn maintenance tool, where the material is configured to inhibit passage of sunlight through the material. In further examples, the sun shade can be foldable at one or more locations by using breakaway hinges. A kit including the sun shade can also be used to modify the lawn maintenance tool.

12 Claims, 7 Drawing Sheets

(56) References Cited

U.S. PATENT DOCUMENTS

| | | | |
|---|---|---|---|
| 3,890,989 A * | 6/1975 | Kuxhouse | ............... A45B 25/02 |
| | | | 135/133 |
| 5,836,327 A | 11/1998 | Davis | |
| 5,842,732 A * | 12/1998 | Daggett | ................... B60J 7/165 |
| | | | 296/102 |
| 6,105,594 A | 8/2000 | Diaz | |
| 2005/0168007 A1 | 8/2005 | Westendorf | |
| 2009/0183757 A1 | 7/2009 | Koch, III | |

* cited by examiner

SUN SCREEN STRUCTURE

This application claims the benefit of U.S. Provisional Application No. 62/397,602, filed Sep. 21, 2016, the entire disclosure of which is hereby incorporated herein by reference.

BACKGROUND

1. Field of the Disclosure

The present disclosure relates to lawn and garden equipment, and more particularly, to a structure for an adjustable sun screen structures that can be applied to any number of lawn maintenance vehicles.

2. Description of Related Art

Currently available riding lawn mowers, garden tractors, and the like often have mounting structure for sun shades. However, if a lawn maintenance vehicle owner has several models and manufacturers of those vehicles, that person will require each of the different styles and models of sun shades in order to cover each of them. Additionally, some known sun shades are inflexible when encountering fixed or relatively solid objects such as tree branches that can cause damage to the sun shade.

Therefore, a need exists for a sun shade enabling mounting on several different models and manufacturers of lawn maintenance vehicles.

BRIEF SUMMARY

According to one aspect of the present disclosure, a sun shade for a lawn maintenance tool includes a bracket. The bracket is configured to accommodate a profile of the lawn maintenance tool to the rear of the seat. The sun shade also includes a frame configured to cooperate with the brackets. The sun shade further includes a fastener, where the fastener attaches the frame and the bracket to the lawn maintenance tool. The sun shade still further includes a quantity of material attached to the frame above the lawn maintenance tool, where the material is configured to inhibit passage of sunlight through the material.

According to another aspect of the present disclosure, a sun shade for a lawn maintenance tool includes a bracket configured to accommodate a profile of the lawn maintenance tool to the rear of the seat. The sun shade also includes a frame configured to cooperate with the brackets. The sun shade further includes a fastener, where the fastener attaches the frame and the bracket to the lawn maintenance tool. The sun shade still further includes a quantity of material attached to the frame above the lawn maintenance tool, where the material is configured to inhibit passage of sunlight through the material. The sun shade also includes a first hinge attached to the frame, where the hinge is configured to enable the sun shade frame to fold at a first location as a result of a force.

According to yet another aspect of the present disclosure, a kit for modifying a lawn maintenance tool includes a set of mounting brackets. The kit also includes a plurality of fasteners and a universal mounting tube. The kit further includes a sun shade having a frame and an amount of material, where the sun shade is foldable. The kit components are used to modify an associated existing lawn maintenance tool to place a sun shade above the lawn maintenance tool with the amount of material configured to inhibit passage of sunlight through the material.

BRIEF DESCRIPTION OF THE DRAWINGS

The foregoing and other aspects of the present disclosure will become apparent to those skilled in the art to which the present disclosure relates upon reading the following description with reference to the accompanying drawings, in which.

Figure 2:
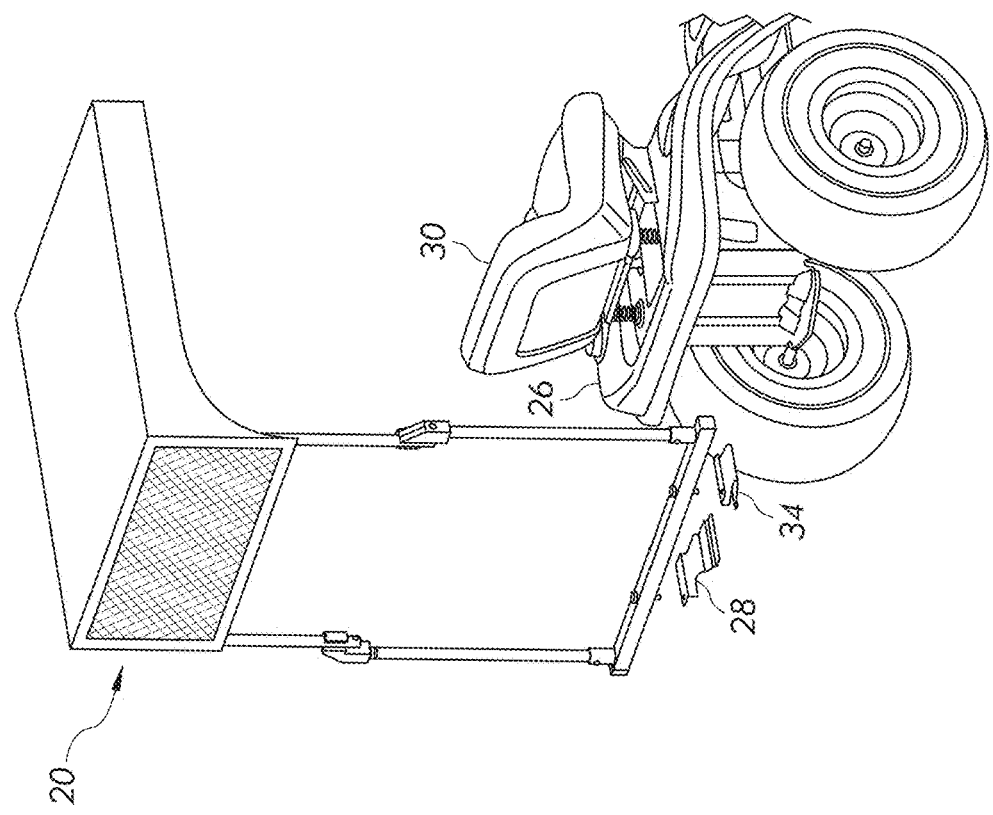
FIG. 2 is an exploded view of the sun shade of FIG. 1 disassembled from the lawn maintenance tool to show the relationship of brackets to the sun shade.

It should be noted that all the drawings are diagrammatic and not drawn to scale. Relative dimensions and proportions of parts of these figures have been shown exaggerated or reduced in size for the sake of clarity and convenience in the drawings. The same reference numbers are generally used to refer to corresponding or similar features in the different embodiments. Accordingly, the drawing(s) and description are to be regarded as illustrative in nature and not as restrictive.

DETAILED DESCRIPTION

Example embodiments that incorporate one or more aspects of the present disclosure are described and illustrated in the drawings. These illustrated examples are not intended to be a limitation on the present disclosure. For example, one or more aspects of the present disclosure can be utilized in other embodiments and even other types of devices. Moreover, certain terminology is used herein for convenience only and is not to be taken as a limitation on the present disclosure. Still further, in the drawings, the same reference numerals are employed for designating the same elements.

Figure 1:
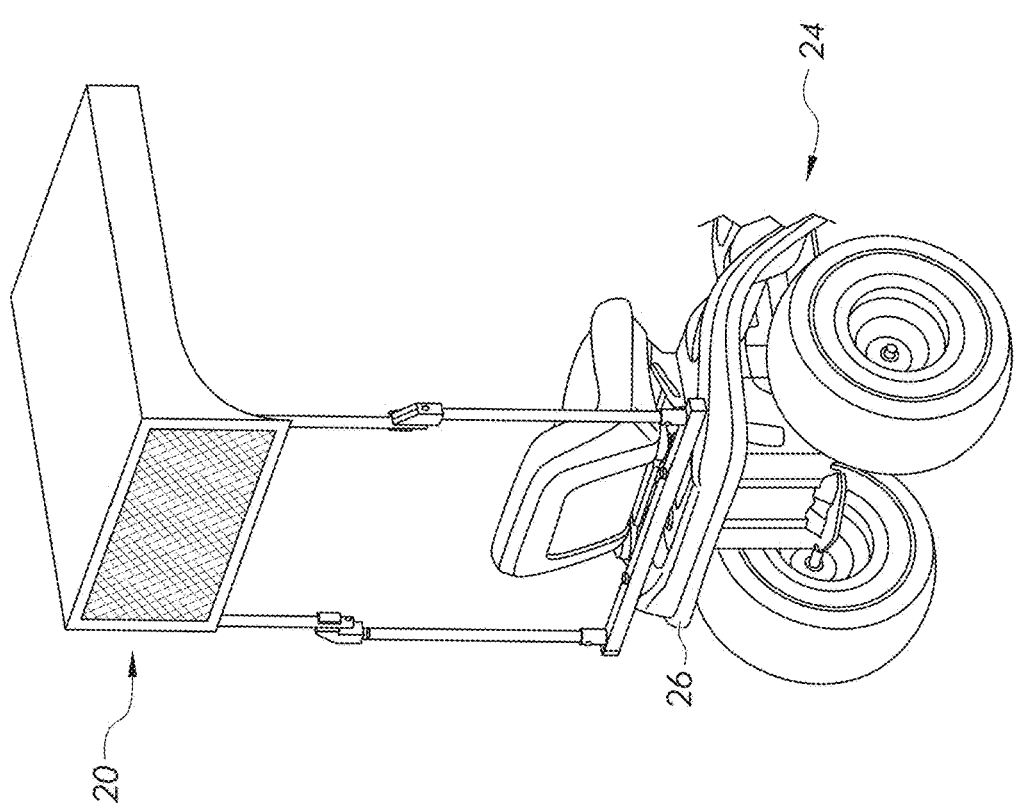
FIG. 1 is a perspective view of an example universal sun shade attached to a lawn maintenance tool according to at least one embodiment of the present disclosure.

Turning to FIG. 1, a universal sun shade 20 attached to a lawn maintenance tool 24 is shown. The lawn maintenance tool 24 can be a riding lawn mower or any similar device that may be desired to include a device to help prevent a portion of the sun's rays from reaching an operator who is using the lawn maintenance tool 24. Only a portion of the lawn maintenance tool 24 is shown, concentrating on the rear of the lawn maintenance tool 24. Although other locations on the lawn maintenance tool 24 are contemplated, the sun shade 20 is configured to mount to a rear fender 26 of the lawn maintenance tool 24.

Turning to FIG. 2, an exploded view of the sun shade 20 and its attachment components is shown disassembled from the lawn maintenance tool 24. The sun shade includes a bracket 28 that is configured to accommodate a profile of the lawn maintenance tool 24 to the rear of the seat 30. More particularly, the bracket 28 can be formed to cooperate with the profile of the rear fender 26 of the lawn maintenance tool 24. The sun shade 20 is configured to be mounted to various models and various manufacturers of lawn maintenance tools. As will be shown, a variety of brackets 28 can be provided to cooperate with the various profiles of the rear fender 26 that can be provided with various lawn maintenance tools 24. Additionally, in some examples, the sun shade 20 may include a second bracket 34 enabling the sun shade to be mounted at two locations to the rear fender 26.

Figure 3:
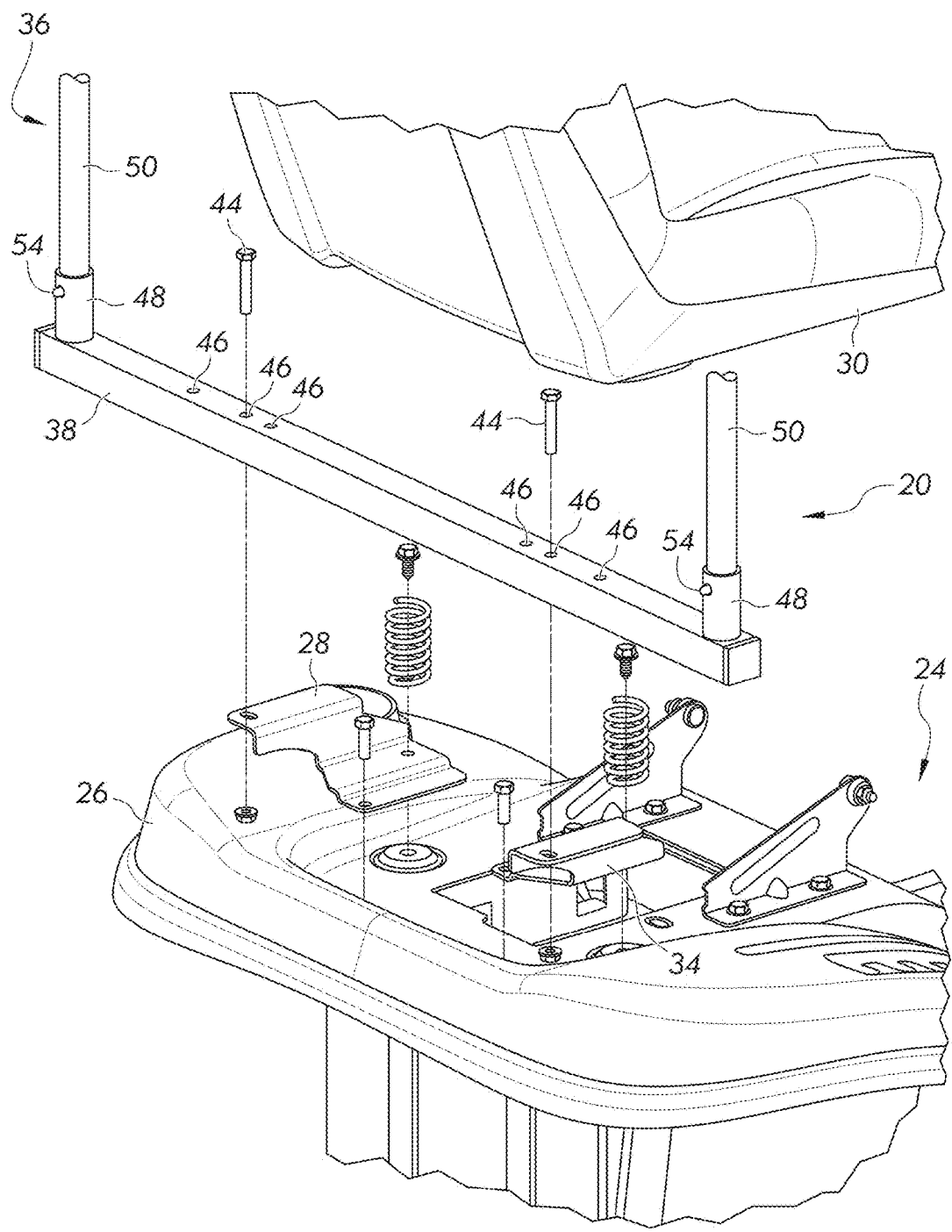
FIG. 3 is a detail exploded view of an attachment scheme for the sun shade of FIG. 1 in relation to a particular lawn maintenance tool fender.

Furthermore, it is anticipated that the profile of a rear fender 26 of any given lawn maintenance tool 24 may not be symmetrical from side to side. In this particular situation, the second bracket 34 can include a different shape than the bracket 28. This can be seen in greater detail in the exploded view of FIG. 3. The bracket 28 shown generally to the rear left of FIG. 3 is of a slightly different shape and the second bracket 34 shown on the right side of FIG. 3.

The sun shade 20 further includes a frame 36 configured to cooperate with the bracket 28. The frame 36 includes a mounting tube 38 that can be attached directly to the brackets 28, 34. As shown, mounting tube 38 can be attached to the brackets 28, 34 by using fasteners 40. Any suitable fasteners 40 are acceptable, including, but not limited to, the threaded fasteners 44 shown FIG. 3. Because the mounting tube 38 is intended to be used on various styles of rear fenders 26, the mounting tube 38 can define multiple apertures 46. Different sets of apertures 46 can be used with various mounting brackets 28, 34 and rear fenders 26. Each end of the mounting tube 38 can include a mounting boss 48 configured to attach a vertical member 50 the mounting tube 38. Again, various attachment members such as a pin, threaded fastener 54, cotter pin, etc. can be used to connect the vertical member 50 to the mounting tube 38. Should an operator choose to remove the sun shade 20 from the lawn maintenance tool 24, the fastener 54 can be removed, and the remainder of the frame 36 can be separated from the mounting tube 38 for storage.

Figure 4:
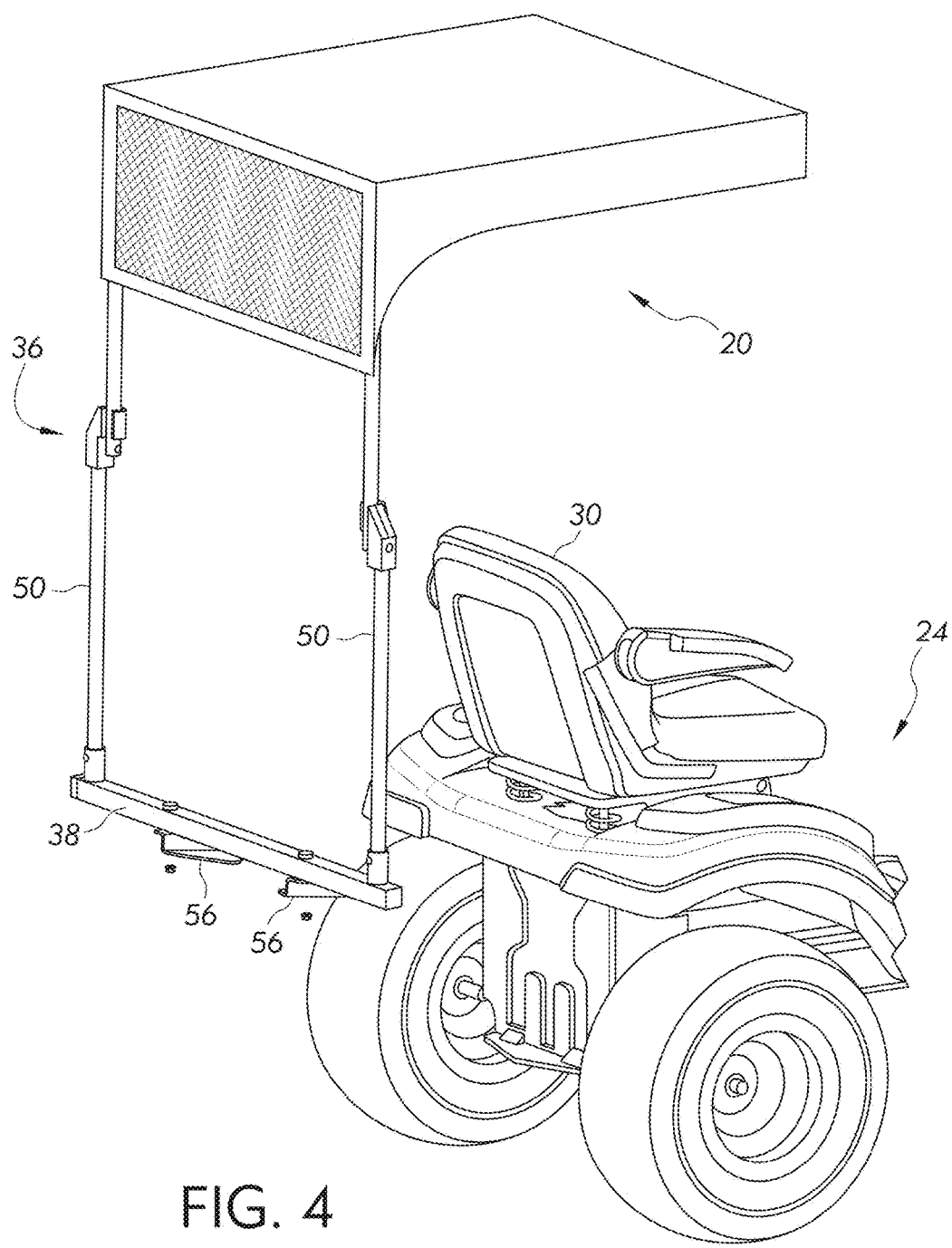
FIG. 4 is similar to FIG. 2 showing the same sun shade in association with a different model of lawn maintenance tool.

Turning to FIG. 4, the sun shade 20 is shown with a different model lawn maintenance tool 24 (e.g., a riding mower or lawn tractor). It is to be appreciated that despite the use with a different model lawn maintenance tool 24, the entirety of the sun shade 20 aside from the brackets 56, are identical to the sun shade 20 shown in FIGS. 2 and 3.

Figure 5:
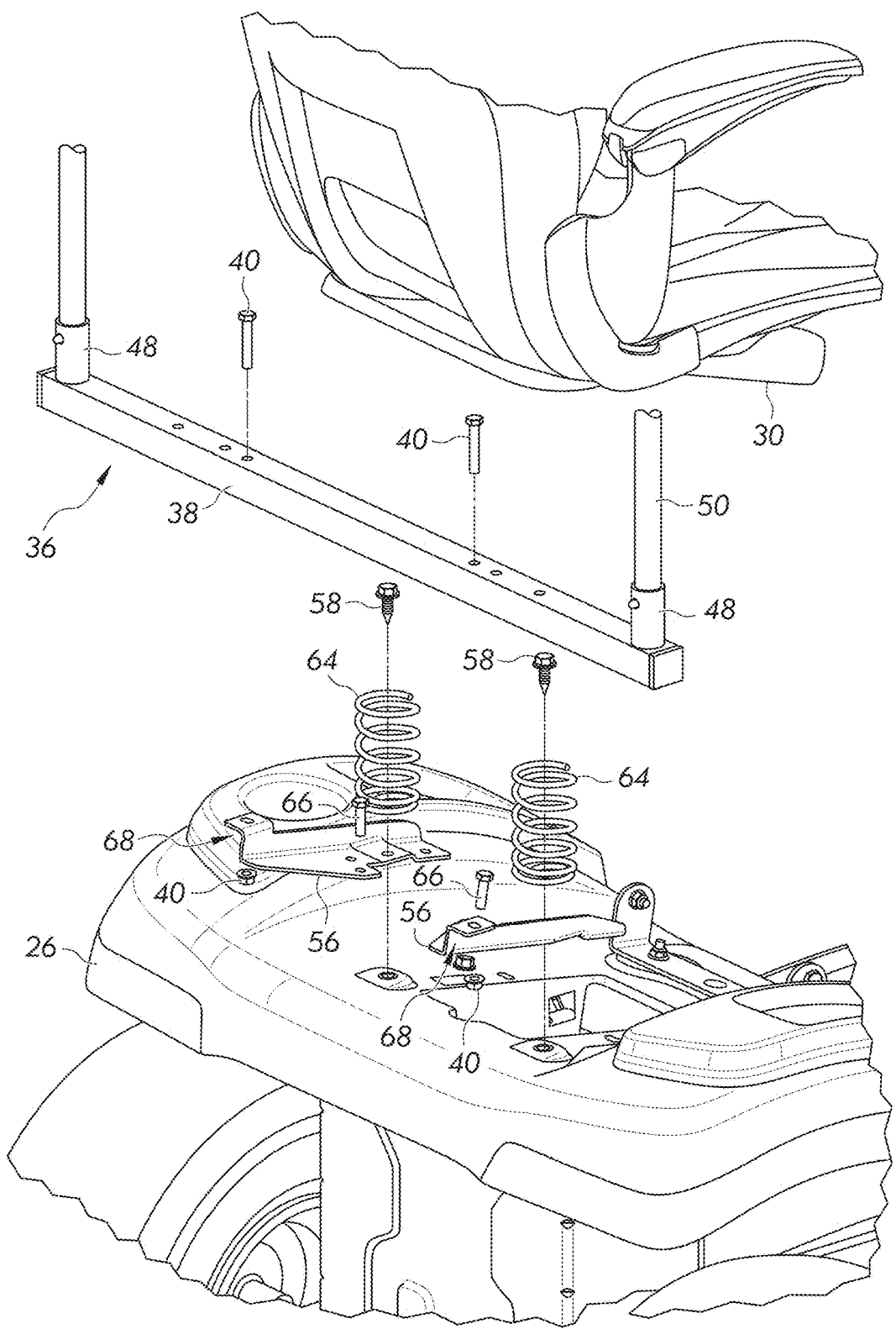
FIG. 5 is similar to FIG. 3, showing an attachment scheme for the sun shade of FIG. 1 on the lawn maintenance tool of FIG. 4.

Turning to the exploded view of FIG. 5, greater detail of the brackets 56 can be seen. With the particular lawn maintenance tool 24 shown in FIG. five, the mounting brackets 56 can be symmetrical. As with the mounting scheme shown in FIG. 3, the mounting brackets 56 are mounted to the rear fender 26 using threaded fasteners 58 located within springs 64 the seat 30. Additional threaded fasteners 66 can fasten the brackets 56 directly to the rear fender 26. As with the previous figures, fasteners 40 can be used to secure the mounting tube 38 to the brackets 56. In both examples, the brackets 28, 34, 56 have offset areas 68 enabling an operator to use a nut 70 to thread onto the threaded portion of the fastener 40, thereby securing the mounting tube 38 to the brackets 56.

Figure 6:
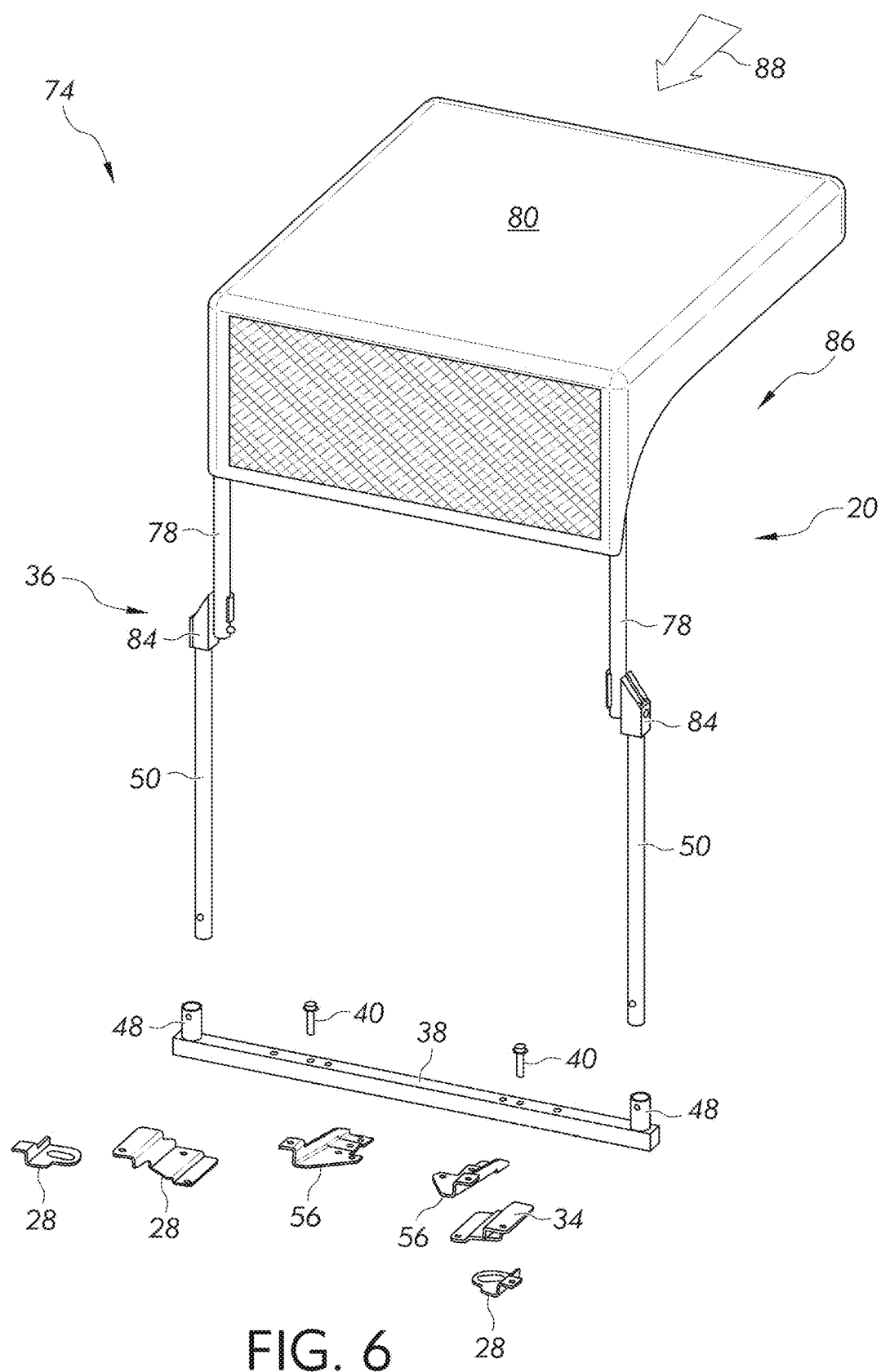
FIG. 6 is a perspective view of the sun shade of FIG. 1 in a kit configured to modify an existing lawn maintenance tool.

Turning to FIG. 6, a kit 74 for modifying the lawn maintenance tool 24 is shown. The kit 74 includes a set of mounting brackets 28, 34, 56 and a plurality of fasteners 40. As previously described the fasteners 40 attached the universal mounting tube 38 to the mounting brackets 28, 34, 56. The kit 74 further includes a sun shade 20 having a frame 36, vertical members 50, foldable vertical members 78, and horizontal members 82 (best seen in FIG. 9). The sun shade 20 further includes an amount of material 80 configured to inhibit passage of sunlight through the material 80. In one example, the material 80 can be a flexible covering such as canvas, plastic, plasticized fabric, cloth, etc. In a further example, the material 80 can be opaque. The material is supported in a generally horizontal position by the horizontal members 82 of the frame 36.

Figure 7:
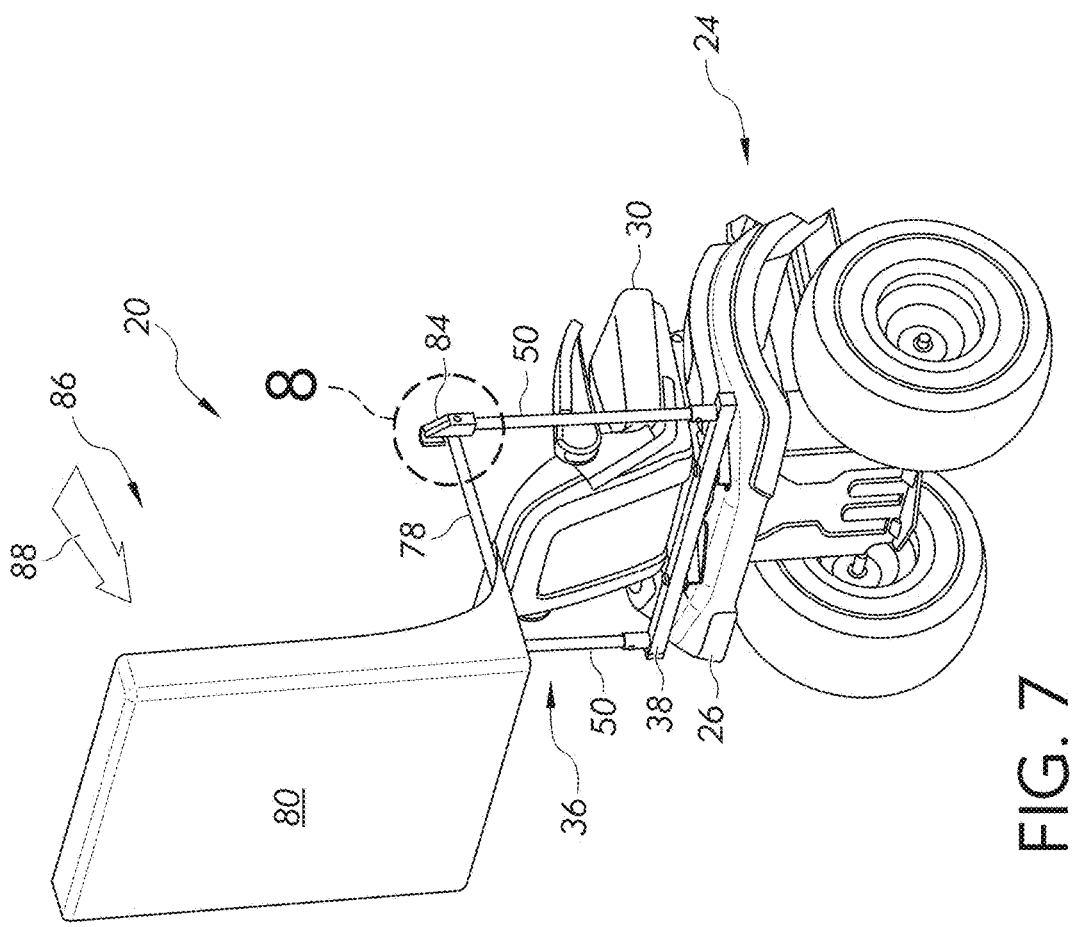
FIG. 7 is a perspective view of the sun shade of FIG. 1 in a first folded position after a force is applied on an upper portion of the sun shade.

Turning to FIG. 7, the sun shade 20 is foldable. As shown, the vertical members 50 extend from the universal mounting tube 38 and are attached to the foldable vertical members 78 through a breakaway hinge 84. The breakaway hinge enables the sun shade 20 remain in place over the lawn maintenance tool 24 under most conditions, including typical mowing conditions. However, when the sun shade 20 encounters an obstacle such as a low hanging branch, or the operator intends to put the sun shade 20 into a storage position, a force is applied to an upper part 86 of the sun shade 20. The force is generally in the direction toward the rear of the lawn maintenance tool 24 and is represented by arrow 88.

Figure 8:
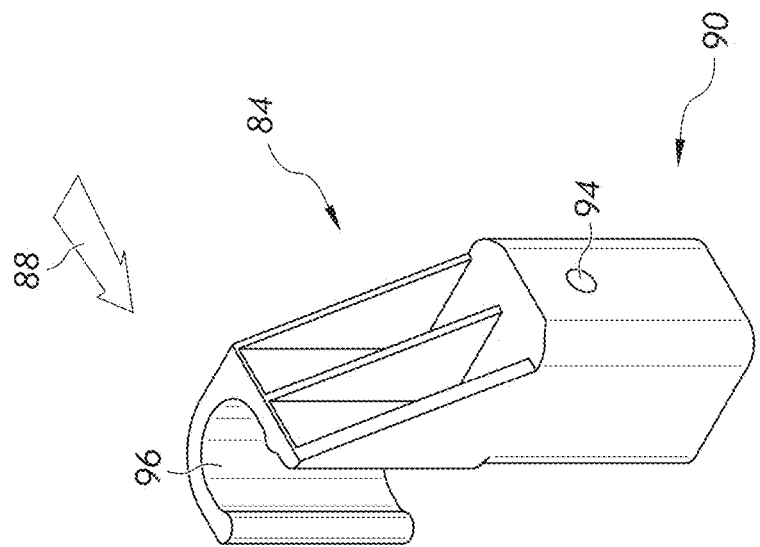
FIG. 8 is a detail view of a breakaway hinge used to connect a vertical member of the frame of the sun shade to a foldable vertical member.

Turning to FIG. 8, a detailed view of the breakaway hinge 84 is shown. In FIG. 8, the vertical member 50 and the foldable vertical member 78 have been removed for clarity. It is to be understood that the vertical member 50 enters a hollowed portion toward the lower end 90 of the breakaway hinge 84. The vertical member 50 is attached to the breakaway hinge 84 through a pin 94. The foldable vertical member 78 passes through a generally cylindrical opening 96 that is open over a portion of its length. The foldable vertical member 78 is also attached to the breakaway hinge 84 through the pin 94. As the force 88 is applied to the sun shade 20, the force can cross a minimum magnitude in order to separate the two sides of the cylindrical opening 96 thereby enabling the foldable vertical member 78 to exit the cylindrical opening 96 by rotating about the pin 94. This enables the top portion of sunshade 20 to fold as shown in FIG. 7. As such, the breakaway hinge 84 is configured to enable the frame 36 to fold at a first location as a result of the force 88.

Figure 9:
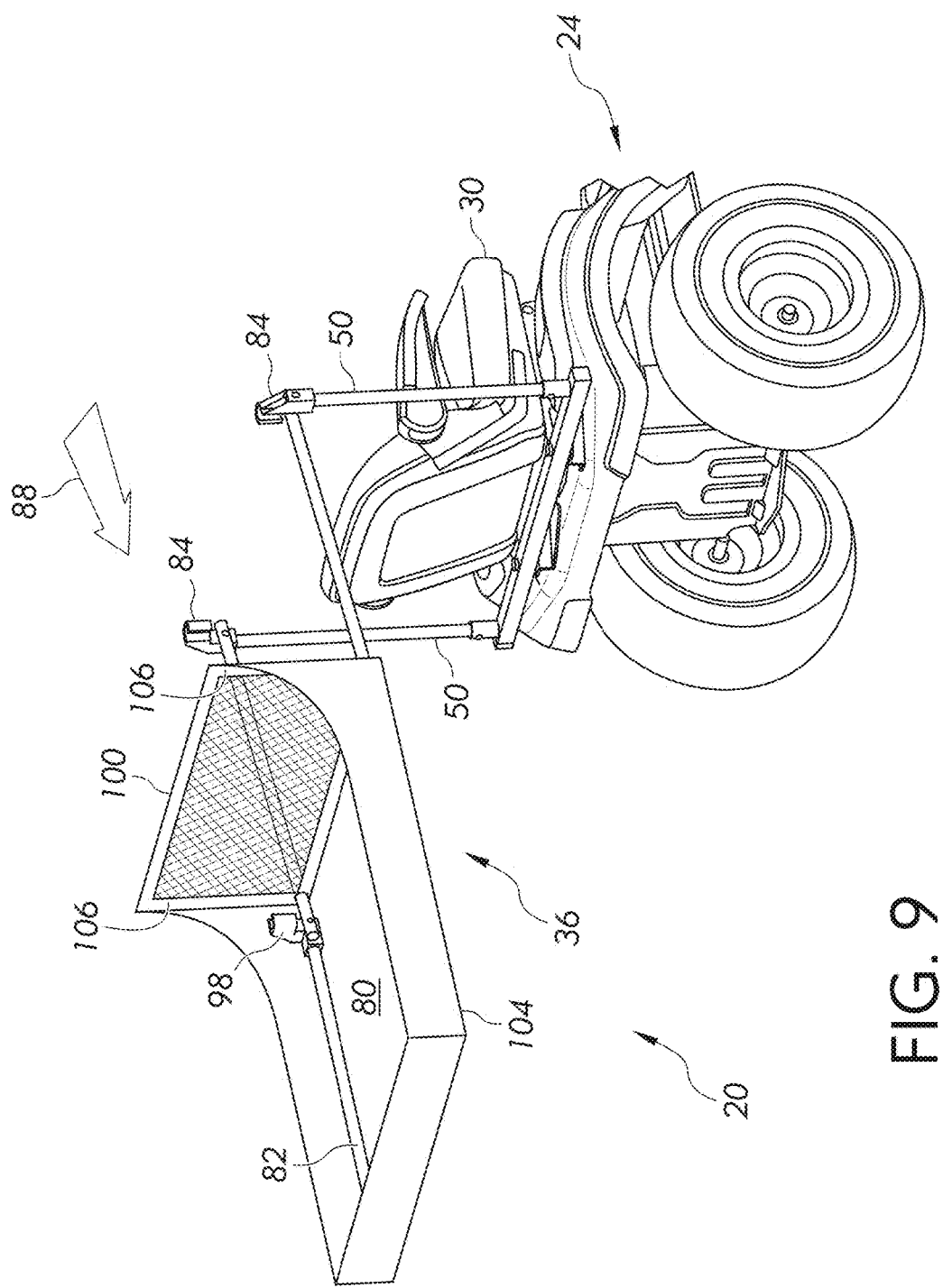
FIG. 9 is similar to FIG. 7 showing the sun shade of FIG. 1 in a second folded position.

Turning to FIG. 9, the first folding operation of the sun shade 20 may not remove the sun shade 20 from the path of the obstacle, or the operator may wish to further fold the sun shade 20. In these cases, if the force 88 is still being applied to the sun shade 20, another breakaway hinge 98 is located at the intersection of the foldable vertical member 78 and the horizontal members 82. This breakaway hinge 98 operates in generally the same way breakaway hinge 84. As such, the sun shade 20 can move to the position shown FIG. 9. The second breakaway hinge 98 is configured to enable the frame 36 to fold at a second location as the frame as a result of continued application of the force. In some examples, a normally downward facing portion 100 of the material 80 can be loosely attached to the side portions 104 of the material 80 in order to permit the horizontal members 82 to pass through the sun screen 20 structure. In one example, lines of a hook and loop fastener can be used at areas 106.

The apparatus of the present disclosure can include numerous benefits. The sun shade 20 can be removably attached to the lawn maintenance tool 24. Moreover, the can be adjusted to fit a wide variety of spacing between mounting holes on a lawn maintenance tool 24, whether in longitudinal or transverse patterns relative to a centerline of the lawn maintenance tool 24. This adjustable location enables the sun shade 20 to fit many different models and manufacturers of lawn maintenance tools 24. Additionally, the brackets 28, 34, 56 are the only components requiring modification when the sun shade 20 is moved from one model of lawn maintenance tool 20 to another model or manufacturer of lawn maintenance tool 20.

While this disclosure has been written in conjunction with the specific embodiments described above, it is evident that many alternatives, combinations, modifications and variations are apparent to those skilled in the art. Accordingly, the described embodiments of this disclosure, as set forth above are intended to be illustrative only, and not in a limiting sense. Various changes can be made without departing from the spirit and scope of this disclosure. Combinations of the above embodiments and other embodiments will be apparent to those of skill in the art upon studying the above description and are intended to be embraced therein. Therefore, the scope of the present disclosure is defined by the appended claims, and all devices, processes, and methods that come within the meaning of the claims, either literally or by equivalence, are intended to be embraced therein. Furthermore, to the extent that the term "includes" is used in either the detailed description or the claims, such term is intended to be inclusive in a manner similar to the term "comprising" as "comprising" is interpreted when employed as a transitional word in a claim.

The invention claimed is:

1. A sun shade for a lawn maintenance tool comprising:
   a bracket, wherein the bracket is configured to accommodate a profile of the lawn maintenance tool to the rear of an associated seat;
   a frame configured to cooperate with the bracket, wherein the frame comprises at least one vertical member;
   a fastener, wherein the fastener attaches the frame and the bracket to the lawn maintenance tool;
   a quantity of material attached to the frame above the lawn maintenance tool, wherein the material is configured to inhibit passage of sunlight through the material; and
   a first hinge attached to the frame, wherein the first hinge is configured to enable the at least one vertical member to fold at a first location as a result of a force, wherein said first hinge includes a generally cylindrical opening that is open over a portion of its length.

2. The sun shade according to claim 1, further comprising a second hinge attached to the frame, wherein the second hinge is configured to enable the sun shade frame to fold at a second location as a result of continued application of the force.

3. The sun shade according to claim 2, wherein the force results from the frame striking an obstacle.

4. The sun shade according to claim 2, wherein the force results from an applied force by an associated operator to place the sun shade into a storage position.

5. The sun shade according to claim 2, wherein the first hinge is a breakaway hinge.

6. The sun shade according to claim 2, wherein the second hinge is a breakaway hinge.

7. The sun shade according to claim 1, further comprising a second bracket.

8. The sun shade according to claim 1, wherein the bracket is configured to accommodate a profile of more than one model of lawn maintenance tool.

9. The sun shade according to claim 1, wherein the frame is universal and can be used with a plurality of models of lawn maintenance tools.

10. The sun shade according to claim 9, wherein the bracket is the only component requiring modification when the sun shade is moved from one model of lawn maintenance tool to another model of lawn maintenance tool.

11. The sun shade according to claim 1, wherein the fastener is a threaded fastener.

12. The sun shade according to claim 1, wherein the material is opaque.

* * * * *